United States Patent
Chen et al.

(10) Patent No.: US 11,275,161 B2
(45) Date of Patent: Mar. 15, 2022

(54) ULTRASOUND RECEIVER CIRCUITRY AND RELATED APPARATUS AND METHODS

(71) Applicant: BFLY Operations, Inc., Guilford, CT (US)

(72) Inventors: Kailiang Chen, Branford, CT (US); Keith G. Fife, Palo Alto, CA (US); Tyler S. Ralston, Clinton, CT (US); Nevada J. Sanchez, Guilford, CT (US); Andrew J. Casper, Clinton, CT (US)

(73) Assignee: BFLY Operations, Inc., Guilford, CT (US)

( * ) Notice: Subject to any disclaimer, the term of this patent is extended or adjusted under 35 U.S.C. 154(b) by 632 days.

(21) Appl. No.: 16/178,871

(22) Filed: Nov. 2, 2018

(65) Prior Publication Data

US 2019/0086525 A1  Mar. 21, 2019

Related U.S. Application Data

(63) Continuation of application No. 14/957,051, filed on Dec. 2, 2015, now Pat. No. 10,175,347.

(51) Int. Cl.
| | | |
|---|---|---|
| *G01S 7/52* | (2006.01) | |
| *G01S 7/527* | (2006.01) | |
| *B06B 1/02* | (2006.01) | |
| *G01S 15/89* | (2006.01) | |

(52) U.S. Cl.
CPC .......... *G01S 7/5273* (2013.01); *G01S 7/5208* (2013.01); *G01S 7/52026* (2013.01); *B06B 1/0292* (2013.01); *G01S 15/8959* (2013.01); *G01S 15/8979* (2013.01)

(58) Field of Classification Search
None
See application file for complete search history.

(56) References Cited

U.S. PATENT DOCUMENTS

| | | |
|---|---|---|
| 4,752,895 A | 6/1988 | Sarr |
| 5,844,445 A | 12/1998 | Takeyari |
| 6,875,178 B2 | 4/2005 | Phelps et al. |
| 7,313,053 B2 | 12/2007 | Wodnicki |

(Continued)

FOREIGN PATENT DOCUMENTS

| | | |
|---|---|---|
| CN | 103607130 A | 2/2014 |
| EP | 1 932 479 A1 | 6/2008 |

(Continued)

OTHER PUBLICATIONS

Murphy, Using Auto-Zero Amplifiers: Optimizing Circuits with Ultra-Precision Op Amps, Applications Engineer, Analog Devices, Inc., Santa Clara, Calif. Oct. 4, 2000 (Year: 2000).*

(Continued)

*Primary Examiner* — Hovhannes Baghdasaryan
(74) *Attorney, Agent, or Firm* — Wolf, Greenfield & Sacks, P.C.

(57) ABSTRACT

Methods and apparatus are described for implementing a coding scheme on ultrasound signals received by a plurality of ultrasonic transducers. The coding, and subsequent decoding, may allow for multiple ultrasonic transducers to be operated in a receive mode simultaneously while still differentiating the contribution of the individual ultrasonic transducers. Improved signal characteristics may result, including improved signal-to-noise ratio (SNR).

12 Claims, 3 Drawing Sheets

(56) References Cited

U.S. PATENT DOCUMENTS

| | | | |
|---|---|---|---|
| 8,490,489 | B2 | 7/2013 | Randall et al. |
| 8,766,721 | B1 | 7/2014 | Dusad |
| 8,852,103 | B2 | 10/2014 | Rothberg et al. |
| 9,112,521 | B2 | 8/2015 | Dedic et al. |
| 9,229,097 | B2 | 1/2016 | Rothberg et al. |
| 9,473,136 | B1 | 10/2016 | Chen et al. |
| 9,492,144 | B1 | 11/2016 | Chen et al. |
| 9,705,518 | B2 | 7/2017 | Chen et al. |
| 9,933,516 | B2 | 4/2018 | Chen et al. |
| 9,958,537 | B2 | 5/2018 | Chen et al. |
| 10,014,871 | B2 | 7/2018 | Chen et al. |
| 10,082,488 | B2 | 9/2018 | Chen et al. |
| 10,175,347 | B2 | 1/2019 | Chen et al. |
| 10,187,020 | B2 | 1/2019 | Chen et al. |
| 10,277,236 | B2 | 4/2019 | Chen et al. |
| 2005/0203392 | A1 | 9/2005 | Petersen et al. |
| 2005/0204819 | A1 | 9/2005 | Taylor |
| 2006/0273805 | A1* | 12/2006 | Peng ............... G01R 27/2605 324/686 |
| 2007/0001764 | A1 | 1/2007 | Huang et al. |
| 2007/0242567 | A1 | 10/2007 | Daft et al. |
| 2009/0140810 | A1 | 6/2009 | Kim et al. |
| 2009/0250729 | A1 | 10/2009 | Lemmerhirt et al. |
| 2009/0289716 | A1 | 11/2009 | Jaeger et al. |
| 2010/0152587 | A1 | 6/2010 | Haider et al. |
| 2010/0317972 | A1 | 12/2010 | Baumgartner et al. |
| 2011/0063011 | A1 | 3/2011 | Barlow |
| 2012/0203105 | A1 | 8/2012 | Yamamoto et al. |
| 2012/0262221 | A1 | 10/2012 | Bottarel et al. |
| 2013/0077445 | A1* | 3/2013 | Um ............... G01S 7/52026 367/135 |
| 2013/0187697 | A1 | 7/2013 | Choy et al. |
| 2014/0031693 | A1 | 1/2014 | Solek |
| 2014/0078866 | A1 | 3/2014 | Kanamori et al. |
| 2014/0236533 | A1 | 8/2014 | Drachmann |
| 2014/0240482 | A1 | 8/2014 | Ikeda et al. |
| 2014/0288428 | A1 | 9/2014 | Rothberg et al. |
| 2015/0032002 | A1 | 1/2015 | Rothberg et al. |
| 2015/0080724 | A1 | 3/2015 | Rothberg et al. |
| 2015/0297193 | A1 | 10/2015 | Rothberg et al. |
| 2017/0160239 | A1 | 6/2017 | Chen et al. |
| 2017/0160387 | A1 | 6/2017 | Chen et al. |
| 2017/0160388 | A1 | 6/2017 | Chen et al. |
| 2017/0163225 | A1 | 6/2017 | Chen et al. |
| 2017/0163276 | A1 | 6/2017 | Chen et al. |
| 2017/0202541 | A1 | 7/2017 | Ralston |
| 2017/0264307 | A1 | 9/2017 | Chen et al. |
| 2017/0307739 | A1 | 10/2017 | Chen et al. |
| 2017/0363725 | A1 | 12/2017 | Ignjatovic et al. |
| 2018/0210073 | A1 | 7/2018 | Chen et al. |
| 2018/0262200 | A1 | 9/2018 | Chen et al. |
| 2018/0364200 | A1 | 12/2018 | Chen et al. |
| 2019/0140603 | A1 | 5/2019 | Chen et al. |

FOREIGN PATENT DOCUMENTS

| | | |
|---|---|---|
| FR | 2 726 408 A1 | 5/1996 |
| JP | 2002-125969 A | 5/2002 |
| JP | 2010-022761 A | 2/2010 |
| JP | 2010-042146 A | 2/2010 |
| JP | 2010-167167 A | 8/2010 |
| JP | 2010-193329 A | 9/2010 |
| JP | 2012-528685 A | 11/2012 |
| JP | 2015-033123 A | 2/2015 |
| JP | 2015-056890 A | 3/2015 |
| JP | 2015-115883 A | 6/2015 |
| TW | 201445554 A | 12/2014 |

OTHER PUBLICATIONS

PCT/US2016/064388, Jan. 24, 2017, Invitation to Pay Additional Fees.
PCT/US2016/064388, Apr. 4, 2017, International Search Report and Written Opinion.
PCT/US2016/064388, Jun. 14, 2018, International Preliminary Report on Patentability.
EP 16871486.3, Jun. 18, 2019, Extended European Search Report.
EP 16871492.1, Jul. 18, 2019, Extended European Search Report.
EP 16871500.1, Jun. 17, 2019, Extended European Search Report.
EP 16871466.5, May 28, 2019, Extended European Search Report.
EP 16871463.2, Jun. 4, 2019, Extended European Search Report.
Extended European Search Report dated Jun. 18, 2019 in connection with European Application No. 16871486.3.
Extended European Search Report dated Jul. 18, 2019 in connection with European Application No. 16871492.1.
Extended European Search Report dated Jun. 17, 2019 in connection with European Application No. 16871500.1.
Extended European Search Report dated May 28, 2019 in connection with European Application No. 16871466.5.
Extended European Search Report dated Jun. 4, 2019 in connection with European Application No. 16871463.2.
Reyes et al., A 2GS/s 6-bit CMOS time-interleaved ADC for analysis of mixed-signal calibration techniques. Analog Integrated Circuits and Signal Processing. Springer New York LLC. Jul. 3, 2015; 85(1):3-16.
Um et al., 24.8 An Analog-digital-hybrid single-chip RX beamformer with non-uniform sampling for 2D-CMUT ultrasound imaging to achieve wide dynamic range of delay and small chip area. IEEE International Solid State Circuits Conference. IEEE Service Center. Feb. 9, 2014; pp. 427-7.
Invitation to Pay Additional Fees dated Jan. 24, 2017 for Application No. PCT/US2016/064388.
International Search Report and Written Opinion dated Apr. 4, 2017 for Application No. PCT/US2016/064388.
International Preliminary Report on Patentability dated Jun. 14, 2018 in connection with International Application No. PCT/US2016/064388.
Taiwanese Office Action dated Jan. 19, 2018 in connection with Taiwanese Application No. 105139662.
Agarwal et al., Single-Chip Solution for Ultrasound Imaging Systems: Initial Results. 2007 IEEE Ultrasonics Symposium. Oct. 1, 2007;1563-6.
Chen et al., Ultrasonic Imaging Front-End Design for CMUT: A 3-Level 30Vpp Pulse-Shaping Pulser with Improved Efficiency and a Noise-Optimized Receiver. IEEE Asian Solid-State Circuits Conference. Nov. 12-14, 2012;173-6.
Cheng et al., An Efficient Electrical Addressing Method Using Through-Wafer Vias for Two-Dimensional Ultrasonic Arrays. 2000 IEEE Ultrasonics Symposium. 2000;2:1179-82.
Cheng et al., CMUT-in-CMOS ultrasonic transducer arrays with on-chip electronics. Transducers 2009. IEEE. Jun. 21, 2009;1222-5.
Cheng et al., Electrical Through-Wafer Interconnects with Sub-PicoFarad Parasitic Capacitance. 2001 Microelectromechan Syst Conf. Aug. 24, 2001;18-21.
Daft et al., 5F-3 A Matrix Transducer Design with Improved Image Quality and Acquisition Rate. 2007 IEEE Ultrasonics Symposium. Oct. 1, 2007;411-5.
Daft et al., Microfabricated Ultrasonic Transducers Monolithically Integrated with High Voltage Electronics. 2004 IEEE Ultrasonics Symposium. Aug. 23, 2004;1:493-6.
Gurun et al., Front-end CMOS electronics for monolithic integration with CMUT arrays: circuit design and initial experimental results. Proc Ultrason Symp. 2008;390-3.
Khuri-Yakub et al., Miniaturized Ultrasound Imaging Probes Enabled by CMUT Arrays with Integrated Frontend Electronic Circuits. Conf Proc IEEE Eng Med Biol Soc. 2010;1:5987-90. doi: 10.1109/IEMBS.2010.5627580. Epub Dec. 6, 2010. 13 pages.
Kim et al., Design and Test of A Fully Controllable 64×128 2-D CMUT Array Integrated with Reconfigurable Frontend ASICs for Volumetric Ultrasound Imaging. IEEE. International Ultrasonics Symposium Proceedings. Oct. 7-10, 2012;77-80. doi: 10.1109/ULTSYM.2012.0019.

* cited by examiner

ULTRASOUND RECEIVER CIRCUITRY AND RELATED APPARATUS AND METHODS

CROSS-REFERENCE TO RELATED APPLICATIONS

This Application is a continuation claiming the benefit under 35 U.S.C. § 120 of U.S. application Ser. No. 14/957,051, filed Dec. 2, 2015, and entitled "ULTRASOUND RECEIVER CIRCUITRY AND RELATED APPARATUS AND METHODS," which is hereby incorporated herein by reference in its entirety.

BACKGROUND

Field

The technology described herein relates to ultrasound receiver circuitry and related apparatus and methods.

Related Art

Ultrasound probes often include one or more ultrasound sensors which sense ultrasound signals and produce corresponding electrical signals. The electrical signals are processed in the analog or digital domain. Sometimes, ultrasound images are generated from the processed electrical signals.

BRIEF SUMMARY

According to an aspect of the application, an apparatus is provided, comprising an ultrasonic transducer, a receive circuit coupled to the ultrasonic transducer, and a switching circuit having an input terminal and first and second output terminals, the input terminal coupled to the receive circuit. The apparatus further comprises a summation circuit having first and second input terminals switchably coupled to the first and second output terminals of the switching circuit, the summation circuit configured to output an output signal representing a combination of an output signal from the ultrasonic transducer with one or more output signals from one or more other ultrasonic transducers.

According to an aspect of the application, a method for processing an ultrasound signal is provided, comprising receiving a plurality of ultrasound signals at a switching circuit, the switching circuit having first and second outputs, and outputting the plurality of ultrasound signals to the first and/or second outputs. The method further comprises combining values on the first and second outputs.

According to an aspect of the application, an ultrasound device is provided, comprising a plurality of ultrasonic transducers, an analog encoding circuit coupled to outputs of the plurality of ultrasonic transducers, and an analog-to-digital converter (ADC) coupled to an output of the analog encoding circuit. The ultrasound device further comprises a digital decoding circuit coupled to an output of the ADC.

According to an aspect of the application, a method of processing ultrasound signals is provided, comprising receiving ultrasound signals with a plurality of ultrasonic transducers, producing, from the plurality of ultrasonic transducers, a plurality of analog output signals representing the ultrasound signals received by the plurality of ultrasonic transducers, and encoding the plurality of analog output signals to produce a plurality of analog encoded signals. The method further comprises digitizing the plurality of analog encoded signals to produce a plurality of digital encoded signals, and decoding the plurality of digital encoded signals.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Aspects of the present application relate to ultrasound sensor signal processing techniques and related circuitry for performing the processing. According to an aspect of the present application, a plurality of ultrasound sensors are activated simultaneously to receive ultrasound signals during an acquisition window. Each of the ultrasound sensors produces a respective electrical output signal. The electrical output signals may be coded during the acquisition window, and may also be provided to a summation circuit, which in some embodiments is part of an averaging circuit. The coding may be used to create different combinations of input signals to the summation circuit. The summation circuit outputs a summed signal, which may be decoded to derive the respective contributions of the electrical output signals of the ultrasound sensors. Thus, the signal-to-noise ratio (SNR) of the signals may be improved compared to other techniques.

In some embodiments, an averaging circuit is included to produce an average of the electrical output signals provided to the summation circuit. The averaging circuit may include the summation circuit with suitable additional circuitry to generate an average of the summed signal. In further alternatives, the electrical output signal provided to the summation circuit may be normalized prior to input to the summation circuit.

The aspects and embodiments described above, as well as additional aspects and embodiments, are described further below. These aspects and/or embodiments may be used individually, all together, or in any combination of two or more, as the application is not limited in this respect.

Figure 1:
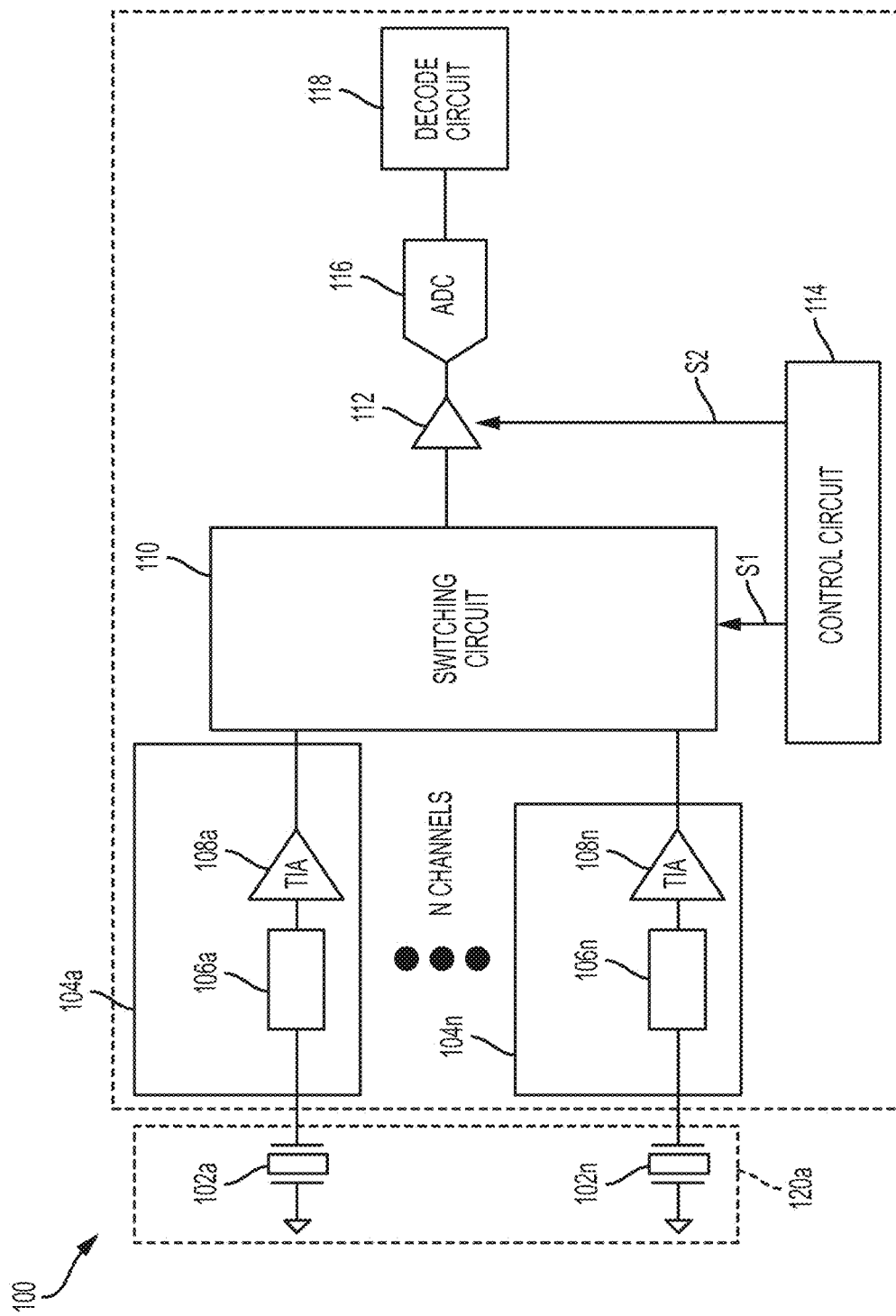
FIG. 1 illustrates a circuit for processing received ultrasound signals, according to a non-limiting embodiment of the present application.

FIG. 1 illustrates a circuit for processing received ultrasound signals, according to a non-limiting embodiment of the present application. The circuit 100 includes N ultrasonic transducers 102a . . . 102n, wherein N is an integer. The ultrasonic transducers are sensors in some embodiments, producing electrical signals representing received ultrasound signals. The ultrasonic transducers may also transmit ultrasound signals in some embodiments. The ultrasonic transducers may be capacitive micromachined ultrasonic transducers (CMUTs) in some embodiments. The ultrasonic transducers may be piezoelectric micromachined ultrasonic transducers (PMUTs) in some embodiments. Further alternative types of ultrasonic transducers may be used in other embodiments.

The circuit 100 further comprises N receive circuitry channels 104a . . . 104n. The receive circuitry channels may correspond to a respective ultrasonic transducer 102a . . . 102n. For example, there may be eight ultrasonic transducers 102a . . . 102n and eight corresponding receive circuitry channels 104a . . . 104n. In some embodiments, the number of ultrasonic transducers 102a . . . 102n may be greater than the number of receive circuitry channels.

The receive circuitry channels 104a . . . 104n may receive the electrical signals output from respective ultrasonic transducers 102a . . . 102n. In the illustrated example, each receive circuitry channel 104a . . . 104n includes a respective receive switch 106a . . . 106n and an amplifier 108a . . . 108n. The receive switches 106a . . . 106n may be controlled to activate/deactivate readout of an electrical signal from a given ultrasonic transducer 102a . . . 102n. More generally, the receive switches 106a . . . 106n may be receive circuits, since alternatives to a switch may be employed to perform the same function. The amplifiers 108a . . . 108n may be trans-impedance amplifiers (TIAs) in some embodiments. The amplifiers 108a . . . 108n may output analog signals.

The circuit 100 further comprises a switching circuit 110. The switching circuit 110 is coupled to outputs of the amplifiers 108a . . . 108n to receive signals output by those amplifiers. The switching circuit 110 is coupled to an averaging circuit 112 to switchably provide output signals from the amplifiers 108a . . . 108n to the averaging circuit 112. In some embodiments, the averaging circuit 112 is a buffer or an amplifier. In some embodiments, the switching circuit 110 has a number of switches which are operated to select which amplifiers 108a . . . 108n provide their output signals to the averaging circuit 112. In some embodiments, the switching circuit 110 also selects the sign (positive or negative) of the signals provided to the averaging circuit 112 relative to a reference voltage. In some embodiments, the reference voltage is a common mode voltage. The switches of the switching circuit 110 may be cross-coupled switches to perform this function.

As a result of the operation of the switching circuit 110, the averaging circuit 112 may receive output signals from one or more of the amplifiers 108a . . . 108n in various combinations and may provide an averaged output signal. The averaged output signal may be formed in part by adding or subtracting the signals from the various amplifiers 108a . . . 108n, and for this reason the averaging circuit may comprise a summation circuit, such as a summing amplifier or summer. As will be described further below, in some embodiments a summation circuit may be used without an averaging circuit. The averaging circuit 112 may include a variable feedback resistance. The value of the variable feedback resistance may be adjusted dynamically based upon the number of amplifiers 108a . . . 108n from which the averaging circuit receives signals through the switching circuit 110. In some embodiments, the variable resistance may include N resistance settings. That is, the variable resistance may have a number of resistance settings corresponding to the number of receive circuitry channels 104a . . . 104n. Thus, the average output signal may also be formed in part by application of the selected resistance to the combined signal received at the inputs of the averaging circuit 112.

The circuit 100 may further comprise a control circuit 114. The control circuit 114 may control operation of the switching circuit 110 and/or the averaging circuit 112. The control circuit 114 may provide one or more control signals S1 to the switching circuit to control operation of the switches of the switching circuit. Thus, in at least some embodiments, the control signals S1 may be switching signals. The control circuit 114 may provide one or more control signals S2 to the averaging circuit 112 to control a value of the variable feedback resistance. The control circuit 114 may be an integrated circuit (IC) in some embodiments. In some embodiments, the control circuit 114 may be a field programmable gate array (FPGA), application specific integrated circuit (ASIC), or other type of circuit.

The operation of the switching circuit 110 effectively imposes a coding scheme on the output signals of the amplifiers 108a . . . 108n. It should be appreciated that this represents coding the signals received by the ultrasonic transducers 102a . . . 102n, and that the coding may be performed in the analog domain. Coding the signals received by the ultrasonic transducers, and the ability to subsequently decode the signals, allows the signals to be collected from multiple ultrasonic transducers simultaneously, and thus for a greater duration than if only one ultrasonic transducer is activated at a time. This, in turn, contributes to a greater SNR. An example is described below in connection with FIGS. 2 and 3. One type of coding that may be implemented is Hadamard coding. However, alternative orthogonal codes may be used in some embodiments.

The averaging circuit 112 is coupled to an ADC 116. The ADC 116 digitizes the signal(s) from the averaging circuit 112. The ADC 116 may in turn be coupled to a decode circuit 118, which may decode the digitized signals. The decode circuit may be an integrated circuit, may be an ASIC or FPGA, or may be implemented in other forms. In some embodiments, the decode circuit may be implemented in an external component, such as in a processor coupled to the circuit 100.

The components of FIG. 1 may be located on a single substrate or on different substrates. For example, as illustrated, the ultrasonic transducers 102a . . . 102n may be on a first substrate 120a and the remaining illustrated components may be on a second substrate 120b. The first and/or second substrates may be semiconductor substrates, such as silicon substrates. In an alternative embodiment, the components of FIG. 1 may be on a single substrate. For example, the ultrasonic transducers 102a . . . 102n and the illustrated circuitry may be monolithically integrated on the same semiconductor die. Such integration may be facilitated by using CMUTs as the ultrasonic transducers. According to an embodiment, the components of FIG. 1 form part of an ultrasound probe. The ultrasound probe may be handheld. In some embodiments, the components of FIG. 1 form part of an ultrasound patch configured to be worn by a patient.

Figure 2:
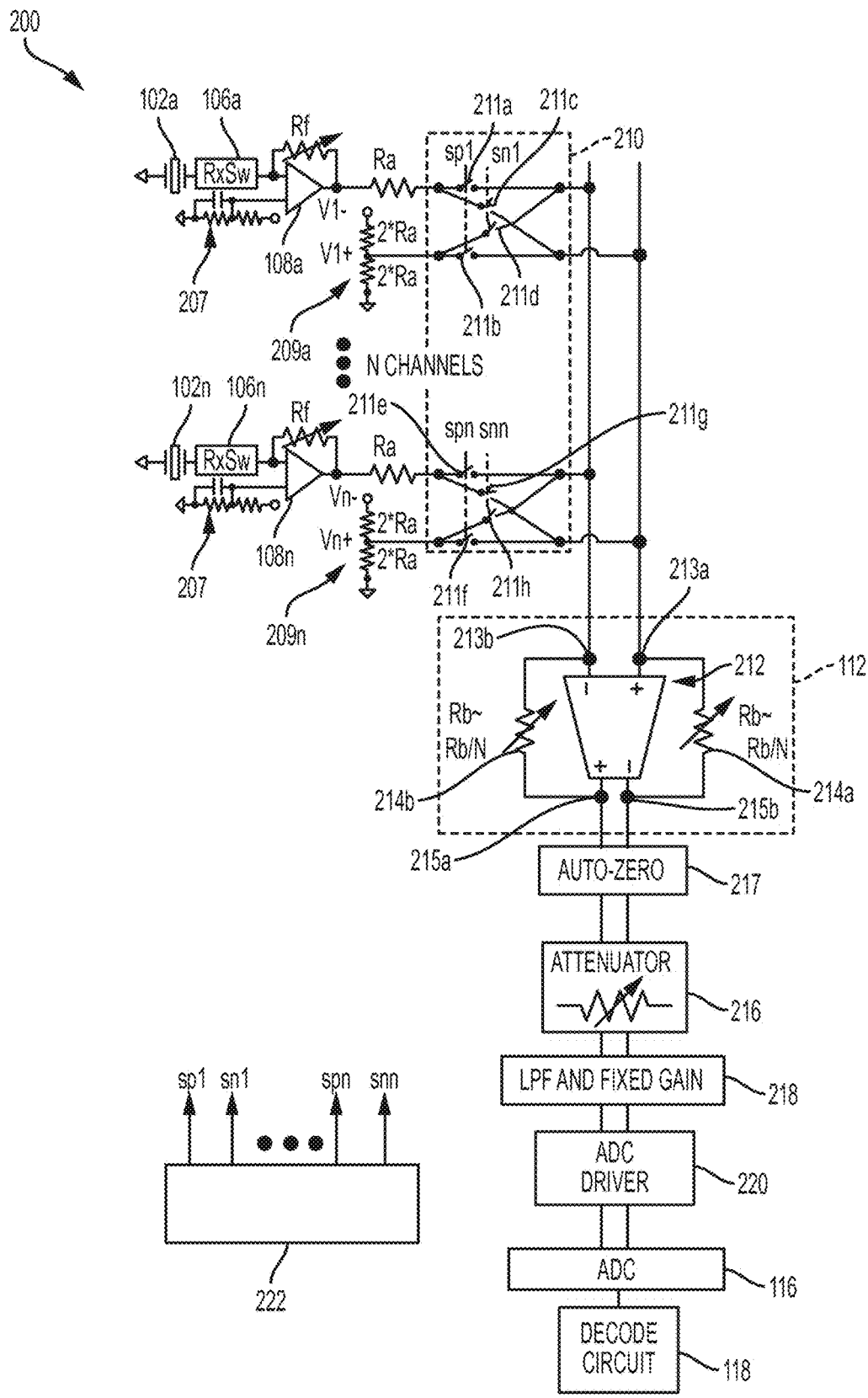
FIG. 2 illustrates a detailed implementation of a circuit consistent with the circuit of FIG. 1, according to a non-limiting embodiment of the present application.

FIG. 2 illustrates a circuit 200 representing a non-limiting example of a circuit consistent with circuit 100 of FIG. 1. As shown, the circuit 200 includes the ultrasonic transducers 102a . . . 102n, receive switches 106a . . . 106n, and amplifiers 108a . . . 108n. In the example of FIG. 2, the amplifiers 108a . . . 108n each have two inputs. One input is coupled to a respective receive switch 106a . . . 106n. A second input is coupled to receive a reference voltage via a respective RC subcircuit 207. The illustrated RC subcircuits 207 include two resistors and a capacitor, with the input of the amplifier 108a . . . 108n coupled to a node between the two resistors. The resistors and capacitor of the subcircuits 207 may have any suitable values to provide a desired reference voltage to the amplifiers 108a . . . 108n. A feedback resistor Rf is provided for each amplifier 108a . .

. 108n. The feedback resistor Rf may be variable, and may be controlled in any suitable manner.

The circuit 200 further comprises a switching circuit 210. The switching circuit 210 represents a non-limiting example of an implementation of the switching circuit 110 of circuit 100. The switching circuit 210 is coupled between the outputs of the amplifiers 108a . . . 108n and the averaging circuit 112. In this example, the switching circuit 210 comprises cross-coupled switches for each of the amplifiers 108a . . . 108n. In some embodiments, the switching circuit comprises cross-coupled switches for one or more of the receive circuitry channels. The averaging circuit 112 includes a gain stage 212 having a positive input terminal 213a and a negative input terminal 213b. The cross-coupled switches of the switching circuit are cross-coupled in that they may be controlled to flip whether the positive input terminal 213a or negative input terminal 213b receives the output of the respective amplifier, with the other input terminal 213a or 213b receiving a common mode signal. The gain stage 212 may be fully differential and may include common mode feedback in some embodiments.

Referring again to switching circuit 210, cross-coupled switches 211a-211d are provided for amplifier 108a. The output voltage of amplifier 108a is converted to a current by a resistor Ra and provided to the switching circuit 210. A common mode voltage is also provided to the switching circuit 210. The common mode voltage may be generated in any suitable manner. In the illustrated example, the common mode voltage is generated from a voltage divider 209a having two resistors each of value 2Ra between a ground terminal and a terminal receiving a negative voltage V1−. Therefore, the common mode voltage may be represented as V1+. Switches 211a and 211c are coupled to the output of amplifier 108a. Switches 211b and 211d are coupled to the common mode voltage. Switches 211a and 211b are controlled by switching signal sp1. Switches 211c and 211d are controlled by switching signal sn1.

In operation, three states may be selected for coupling the amplifier 108a to the averaging circuit 112. In a first state, switching signal sp1 may close switches 211a and 211b while switching signal sn1 may open switches 211c and 211d. In this state, the output current of amplifier 108a is provided to negative input terminal 213b of gain stage 212, while the common mode signal is provided to positive input terminal 213a. In a second state, switching signal sp1 may open switches 211a and 211b while switching signal sn1 may close switches 211c and 211d. In this state, the output of amplifier 108a is provided to positive input terminal 213a of gain stage 212, while the common mode signal is provided to negative input terminal 213b. In a third state, switching signals sp1 and sn1 may open switches 211a-211d, thus disconnecting the amplifier 108a from the averaging circuit 112.

The operation of other receive circuitry channels of the circuit 200 may be substantially the same. For example, the $n^{th}$ channel may be coupled to cross-coupled switches 211e-211h. The output of amplifier 108n may be coupled through a resistor Ra to switches 211e and 211g. A common mode voltage may be provided to switches 211f and 211h. The common mode voltage may be generated by a voltage divider 209n having two resistors each of value 2Ra between a ground terminal and a terminal receiving a negative voltage Vn−. Therefore, the common mode voltage may be represented as Vn+. In a first state of operation, switching signal spn closes switches 211e and 211f and switching signal snn opens switches 211g and 211h. Thus, the output of amplifier 108n is provided to negative input terminal 213b of gain stage 212, while the common mode signal is provided to positive input terminal 213a. In a second state, switching signal spn opens switches 211e and 211f and switching signal snn closes switches 211g and 211h. Thus, the output of amplifier 108n is provided to positive input terminal 213a of gain stage 212, while the common mode signal is provided to negative input terminal 213b. In a third state, switches 211e-211h are opened by switching signals spn and snn, thus disconnecting amplifier 108n from the averaging circuit 112.

The input terminals of the gain stage 212 serve as nodes adding the current from the various receive channel circuitry connected to those nodes. As an example, if switches 211c, 211d, 211g, and 211h are closed, then the output signals of amplifiers 108a and 108n are provided to the positive input terminal 213a of gain stage 212, which may serve to sum the provided currents. Similarly, the negative input terminal 213b may sum the currents provided to it. The averaging circuit outputs a voltage signal. Thus, the averaging circuit converts a current input into a voltage output.

It should be appreciated from the foregoing that the signals provided to the gain stage 212 are pseudo-differential signals, being centered around a common mode signal. The gain stage 212 produces a differential output signal from a positive output terminal 215a and a negative output terminal 215b. The differential signal represents an average of the input signals provided to input terminals 213a-213b. The averaging function is achieved, at least in part, by use of variable feedback resistors 214a and 214b. That is, the input signals to the gain stage are combined (those at the negative input terminal 213b are subtracted from those at the positive input terminal 213a), and then divided based on the resistance setting of the resistors 214a and 214b. In the illustrated embodiment, the variable feedback resistors each have a number of resistance settings, Rb . . . Rb/N, corresponding to the number of receive circuitry channels which may be connected to the gain stage. For example: if the positive input terminal 213a receives the output signal of a single amplifier (e.g., 108a), the variable feedback resistor 214a may be set to a value corresponding to a single activated channel; if the positive input terminal 213a receives the output signals of two amplifiers 108a and 108n, the variable feedback resistor 214a may be set to a value corresponding to two channels; if three of the amplifiers 108a . . . 108n are coupled to the positive input terminal 213a, then the variable feedback resistor 214a may be set to a value corresponding to three channels; and so on. Similarly, the value of the variable feedback resistor 214b may be set to a value corresponding to the number of amplifiers 108a . . . 108n providing signals to the negative input terminal 213b. In this manner, the differential signal output from the averaging circuit 112 may represent an average value, thus having a value falling within a desired target range no matter how many of the amplifiers 108a . . . 108b are coupled to a given input terminal of the averaging circuit 112. Because a receive circuitry channel is considered to be active whether it is providing an ultrasonic transducer output signal or a common mode signal to a given input terminal of the averaging circuit, in practice feedback resistors 214a and 214b will have the same value for a given averaging operation.

The circuit 200 further comprises an auto-zeroing circuit 217 coupled to the output of the averaging circuit 112. The auto-zeroing circuit 217 is coupled to an attenuator 216. The attenuator 216 may provide any suitable attenuation. The attenuated signal may be provided to a low-pass filter (LPF) and fixed gain amplifier 218. The output of the LPF and fixed gain amplifier 218 may be coupled to an ADC driver 220. The ADC driver 220 may drive the ADC 116. The ADC 116 is coupled to the decode circuit 118 as previously described in connection with FIG. 1.

The circuit 200 further comprises a control circuit 222 which is configured to produce the switching signals for the switches of the switching circuit 210. The control circuit 222 may also produce control signals controlling the setting of the variable resistors 214a and 214b. The control circuit 222 may be of a type described previously in connection with control circuit 114.

Figure 3:
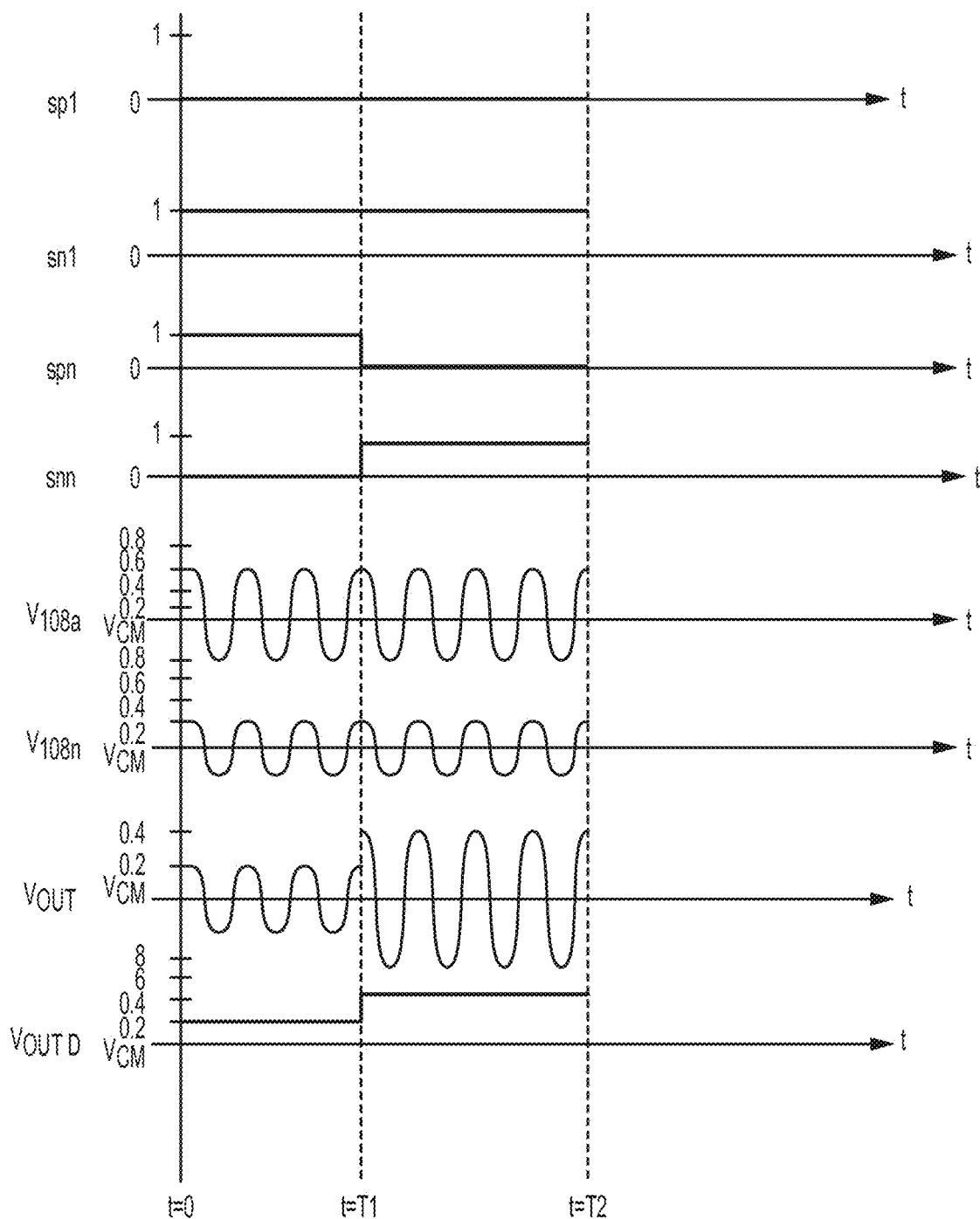
FIG. 3 is a collection of timing diagrams representing an example of the operation of the circuit of FIG. 2, according to a non-limiting embodiment of the present application.

FIG. 3 is a collection of timing diagrams illustrating an example of the operation of the circuit 200 of FIG. 2. The illustrated example assumes the circuit 200 includes only two receive circuitry channels. However, it should be appreciated that the illustrated operation may be expanded to any number of receive circuitry channels.

It is assumed for purposes of FIG. 3 that the signal output by amplifier 108a has a voltage amplitude of 0.6V relative to a common mode voltage $V_{cm}$ throughout the illustrated duration, and that the amplifier 108n has an voltage amplitude of 0.2V relative to $V_{cm}$. In some embodiments, the value of $V_{cm}$ may be between approximately 0.5V and 0.75V, and the amplifier outputs relative to $V_{cm}$ may be up to approximately 0.75V, positive or negative. As shown in FIG. 3, the signals may be oscillating signals.

From time t=0 until time t=T1, the output of amplifier 108a is provided to positive input terminal 213a of gain stage 212. That means that switching signal sp1 is low (here, assumed to be zero, although other values may be used) to open switches 211a and 211b, and switching signal sn1 is high (here, assumed to be one, although other values may be used) to close switches 211c and 211d. During the same time period, the output of amplifier 108n is provided to negative input terminal 213b of gain stage 212. That means that switching signal spn is high to close switches 211e and 211f, and switching signal snn is low to open switches 211g and 211h.

Thus, from time t=0 to time t=T1, the voltage $V_{108n}$ output by amplifier 108n is effectively subtracted from the voltage $V_{108a}$ output by amplifier 108a. (The person of ordinary skill in the art will recognize that the currents provided to the terminals 213a and 213b are what are subtracted, but for simplicity FIG. 3 illustrates the voltages output by amplifier 108a and 108n) The subtraction is performed by the gain stage 212. Additionally, the feedback resistors 214a and 214b are set to values corresponding to the fact that two receive circuitry channels are activated. In this example, then, the differential output signal from the averaging circuit 112 has a voltage amplitude, $V_{out}$, of 0.2V (relative to the common mode voltage $V_{cm}$) during the indicated timeframe.

During a time interval from T1 to T2, the switching circuit 210 is controlled to decouple the output of amplifier 108n from the negative input terminal 213b and instead to couple it to the positive input terminal 213a. To achieve this, the switching signal spn is sent low and the switching signal snn is sent high. As a result, switches 211e and 211f are opened and switches 211g and 211h are closed. In this state, the output voltages $V_{108a}$ and $V_{108n}$ of amplifiers 108a and 108n are effectively added at the input terminal 213a of the gain stage 212. And, as with the period from t=0 to t=T1, the feedback resistors 214a and 214b are set to values corresponding to the fact that two receive circuitry channels are activated. Thus, the output signal of the averaging circuit 112 assumes a voltage amplitude of 0.4V relative to $V_{cm}$.

Although the output signal of the averaging circuit 112 may be an oscillating signal, just like the input signals it receives, the amplitude value is illustrated in simplified form as $V_{outd}$ in FIG. 3 to illustrate its change from one time interval to the next.

The operation illustrated in FIG. 3 allows for determination of how much each ultrasonic transducer 102a and 102n contributed to the output signal of the averaging circuit. Namely, the following information in Table 1 is known.

TABLE 1

| Time Interval | Transducer Relationship | $V_{out}$ (V) |
| --- | --- | --- |
| t = 0 → t = T1 | $(V_{108a} - V_{108n})/2$ | 0.2 |
| t = T1 → t = T2 | $(V_{108a} + V_{108n})/2$ | 0.4 |

From Table 1, two equations in two unknowns ($V_{108a}$ and $V_{108n}$) may be formulated as:

$$V_{108a} - V_{108a} = 0.2N \quad \text{(Eq. 1)}$$

$$V_{108a} + V_{108n} = 0.4N \quad \text{(Eq. 2)}$$

where N here represents the number of activated channels. Thus, N is 2 in the example of FIG. 3. Solving the equations effectively decodes the codes implemented by the switching circuit during the different time intervals from t=0 to t=T1 and t=T1 to t=T2. The decoding may be performed by the decoding circuits of the types described herein, although alternative components may be used in some embodiments.

It should also be appreciated that the foregoing operation provides an improved SNR compared to if the signal from each ultrasonic transducer was collected during its own respective time interval. This is because in the illustrated operation the signal is collected simultaneously from the ultrasonic transducers 102a and 102n, and thus over the entire duration t=0 to t=T2. The collected signal is therefore greater than if the signal of ultrasonic transducer 102a was collected only during the interval up to T1 and if the signal of ultrasonic transducer 102n was collected only during the interval from T1 to T2. The improvement in SNR may depend on the duration over which the signals of the ultrasonic transducers are collected.

The example of FIG. 3 assumes the circuit 200 includes two ultrasonic transducers and two receive circuitry channels. It should be appreciated that the same type of operation may be extended to any suitable number of ultrasonic transducers and receive circuitry channels. Moreover, the operation illustrated in FIG. 3 allows for the determination of the contributions of the signals from amplifiers 108a and 108n by changing the state of the switches corresponding to only one of the receive circuitry channels. In the example, only the switching states governed by spn and snn are altered during the period from t=0 to t=T2. However, the additional states of the switches corresponding to the receive circuitry channels, including the disable state in which an amplifier is disconnected from the averaging circuit 112, may be utilized to allow for discrimination between a greater number of receive circuitry channels.

Various alternatives to the detailed implementation of FIG. 2 may be used while retaining substantially the same functionality. In FIG. 2, the voltage dividers used to generate the common mode voltage for each of the receive circuitry channels are illustrated proximate the respective amplifiers 108a . . . 108n. Placement of the resistors of the voltage dividers near the amplifiers may result in the noise/interference on the common mode signal being similar or substantially the same as the noise/interference on the output of the amplifiers 108a . . . 108n. Yet, as an alternative, the voltage dividers for generating the common mode voltages may be placed proximate the positive and negative input terminals, 213a and 213b, of the gain stage 212.

While FIGS. 1 and 2 illustrate embodiments in which an averaging circuit is included, not all embodiments are limited to the illustrated manner of implementing the averaging circuit or to including an averaging circuit. For instance, as previously described, the averaging functionality may be achieved using a summation circuit together with suitable division circuitry, such as the feedback resistors 214a and 214b. However, the averaging functionality may alternative be implemented with distributed circuitry. For example, gain stage 212 may perform the summing function at its illustrated location in FIG. 2, while the division function of the averaging operation may be performed by circuitry located elsewhere in the circuitry chain, such as after the auto-zeroing circuit 217. Still, the combination of summation circuitry and division circuitry may be referred to herein as an averaging circuit even if the circuitry making up the averaging circuit is distributed.

Considering that the function of the averaging circuit 112 may be seen as providing a normalized output value, it should be appreciated that further alternative configurations may be implemented. For example, the electrical signals provided as inputs to a summation circuit, such as gain stage 212, may be normalized prior to being input. For example, the signals provided to positive input terminal 213a and negative input terminal 213b of FIG. 2 may be normalized prior to being provided to those terminals, in any suitable manner. As an example, the signals output by amplifiers 108a ... 108n may be attenuated according to one or more attenuation coefficients suitable for normalizing those signals, which in some embodiments may involve applying respective attenuation coefficients to the outputs of the amplifiers 108a ... 108n. When this is done, the feedback resistors 214a and 214b may be eliminated, and thus the averaging circuit 112 may reduce to a summation circuit. Moreover, instead of normalizing the inputs to the summation circuit, the inputs may simply have gains applied to ensure that the output of the summation circuit is within a desired range. Different gains may be applied to the different input signals to the summation circuit, such as the signals produced by amplifiers 108a ... 108n. These gains may be programmable and may be used in conjunction with the sign function of the switching circuitry to provide coding of the type described previously herein where a signal may be positive or negative.

As a further alternative, in some embodiments no averaging or normalization function need be applied in some embodiments. For example, the averaging circuit 112 may instead be a summation circuit configured to produce a summed output of the signals provided to positive input terminal 213a and negative input terminal 213b. Such a configuration may be practical if the signals provided on positive input terminal 213a and negative input terminal 213b are not so large as to cause the summed output of the gain stage 212 (or other summation circuit) to exceed some desired threshold. Thus, such a technique may be used, for example, when the signals provided to the summation circuit are sufficiently weak that their sum will not exceed the threshold.

From the foregoing, it should be appreciated that an aspect of the present application provides for a plurality of ultrasonic transducers coupled to a switching circuit including a number of cross-coupled switches, the outputs of which are coupled to a summation circuit. Optionally, an averaging function may be performed on the outputs of the switching circuit using the summation circuit.

From the foregoing, it should be appreciated that an aspect of the present application provides cross-coupled switches coupled to an output of an ultrasonic transducer. The cross-coupled switches may be controlled to impose a code on the output signals from a plurality of ultrasonic transducers. The code may be used as described above. For example, the code, and a subsequent decoding operation, may be used to allow acquisition from the plurality of ultrasonic transducers over a longer time period than would be possible by individually activating each ultrasonic transducer in turn. Thus, improved SNR may be realized. It should be appreciated from the discussion of the operation of FIGS. 1-3 that when used, the code may include positive and negative values, as well as gain. Thus, coding may include positive and negative values not limited to +/−1.

It should also be appreciated from the foregoing that an aspect of the present application provides a method and apparatus for coding received ultrasound signals in the analog domain and decoding the coded ultrasound signals in the digital domain. For example, FIGS. 1 and 2 illustrate apparatus operating in this manner. It should also be appreciated from those figures and the foregoing discussion that the coding and/or decoding in at least some embodiments is performed in hardware. Coding and/or decoding in hardware may be simpler than alternative manners of coding/decoding.

It should also be appreciated from the foregoing that the coding of signals received by a plurality of ultrasonic transducers after their receipt is distinct from coding ultrasound signals transmitted from a plurality of ultrasonic transducers. Coding transmitted ultrasound signals may allow for an ultrasound receiver to determine which received signal was transmitted by which ultrasonic transducer. The two types of coding may be combined in some embodiments. That is, according to some embodiments, a method and system are provided for coding ultrasound signals when transmitted and for coding received ultrasound signals in the manner described herein with respect to FIGS. 1-3. In practice, such embodiments may require a significantly larger number of coding operations, and corresponding decoding operations, compared to if only type of coding is implemented. The greater number of coding and decoding operations may negatively impact frame rate.

As a further alternative to the described embodiments, it should be appreciated that the described switching behavior in which switches are closed when receiving a switching signal of a high value, and opened when receiving a switching signal of a low value, may be reversed. The various aspects described herein are not limited to use of any particular type of switch, and therefore are not limited to any particular manner of operating the switches.

The various aspects described herein may be used in various applications. According to one embodiment, a moving target indicator may be produced. During a first acquisition window, the sign of a signal from ultrasonic transducer 102a may be retained as positive relative to a reference value. During a second acquisition window, the sign of the signal from the ultrasonic transducer may be made negative relative to the reference value. The signals may be digitized and subsequently summed. Such operation may effectively perform Doppler imaging.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described.

As described, some aspects may be embodied as one or more methods. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

As used herein, the term "between" used in a numerical context is to be inclusive unless indicated otherwise. For example, "between A and B" includes A and B unless indicated otherwise.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. An apparatus, comprising:
   an ultrasonic transducer;
   a receive circuit coupled to the ultrasonic transducer and configured to receive an output signal from the ultrasonic transducer;
   a switching circuit having an input terminal and first and second output terminals, the input terminal configured to receive an output signal from the receive circuit, and the input terminal being switchably coupled to the first or second output terminals; and
   an analog averaging circuit having first and second input terminals coupled to the first and second output terminals, respectively, of the switching circuit;
   wherein:
      the analog averaging circuit is configured to output an analog averaged signal representing an average of a plurality of output signals from a plurality of ultrasonic transducers, the plurality of output signals from the plurality of ultrasonic transducers including the output signal from the ultrasonic transducer;
      the analog averaging circuit comprises a feedback resistor; and
      the apparatus further comprises a control circuit configured to control a resistance value of the feedback resistor based on a number of the plurality of output signals from the plurality of ultrasonic transducers.

2. The apparatus of claim 1, wherein the analog averaging circuit is configured to output the analog averaged signal by averaging a first signal received at a first input terminal of the analog averaging circuit and a second signal received at a second input terminal of the analog averaging circuit.

3. The apparatus of claim 1, wherein the analog averaging circuit comprises an amplifier.

4. The apparatus of claim 1, wherein:
   the ultrasonic transducer is a first ultrasonic transducer and the receive circuit is a first receive circuit;
   the apparatus further comprises a second ultrasonic transducer and a second receive circuit coupled to the second ultrasonic transducer; and
   the switching circuit is configured to sum at the first output terminal a first current signal from the first receive circuit and a second current signal from the second receive circuit.

5. The apparatus of claim 1, wherein the ultrasonic transducer, the receive circuit, the switching circuit, and the analog averaging circuit are monolithically integrated on a same semiconductor chip.

6. An apparatus, comprising:
   an ultrasonic transducer;
   a receive circuit coupled to the ultrasonic transducer and configured to receive an output signal from the ultrasonic transducer;
   a switching circuit having an input terminal and first and second output terminals, the input terminal configured to receive an output signal from the receive circuit, and the input terminal being switchably coupled to the first or second output terminals;
   an analog averaging circuit having first and second input terminals coupled to the first and second output terminals, respectively, of the switching circuit;
   an auto-zeroing circuit coupled to an output of the analog averaging circuit;
   an attenuator coupled to an output of the auto-zeroing circuit; and
   a low-pass filter and fixed gain amplifier coupled to an output of the attenuator.

7. A method for processing a plurality of ultrasound signals, comprising:
   receiving the plurality of ultrasound signals at a switching circuit, the switching circuit having first and second outputs;
   outputting the plurality of ultrasound signals to the first and/or second outputs; and
   averaging a first value on the first output and a second value on the second output to produce an analog signal,
   wherein averaging the first value on the first output and the second value on the second output comprises setting a resistance value based on a number of ultrasound signals in the plurality of ultrasound signals.

8. The method of claim 7, wherein averaging the first value on the first output and the second value on the second output comprises adding the first value and the second value.

9. The method of claim 7, wherein averaging the first value on the first output and the second value on the second output comprises subtracting the first value from the second value.

10. The method of claim 7, further comprising auto-zeroing a result of the averaging.

11. The method of claim 10, further comprising attenuating a result of the auto-zeroing.

12. The method of claim 11, further comprising low-pass filtering and amplifying with a fixed gain a result of the attenuating.

* * * * *